(12) United States Patent
Jeong et al.

(10) Patent No.: US 10,716,141 B2
(45) Date of Patent: Jul. 14, 2020

(54) METHOD FOR CONTROLLING WIRELESS COMMUNICATION NETWORK AND SERVER THEREFOR

(71) Applicant: ELECTRONICS AND TELECOMMUNICATIONS RESEARCH INSTITUTE, Daejeon (KR)

(72) Inventors: Wun Cheol Jeong, Daejeon (KR); Byeong Cheol Choi, Daejeon (KR); Tae Joon Park, Daejeon (KR); Kye Seon Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 306 days.

(21) Appl. No.: 15/822,403

(22) Filed: Nov. 27, 2017

(65) Prior Publication Data
US 2018/0167973 A1   Jun. 14, 2018

(30) Foreign Application Priority Data
Dec. 8, 2016   (KR) .................. 10-2016-0166723

(51) Int. Cl.
*H04W 74/08* (2009.01)
*H04W 72/04* (2009.01)
*H04W 88/08* (2009.01)
*H04W 8/18* (2009.01)

(52) U.S. Cl.
CPC ..... *H04W 74/0808* (2013.01); *H04W 72/044* (2013.01); *H04W 8/186* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 7,519,022 B2 | 4/2009 | Yu et al. | |
| 8,068,838 B1 * | 11/2011 | Dinan | H04W 36/22 370/331 |
| 8,542,653 B1 * | 9/2013 | Dinan | H04W 36/0061 370/331 |
| 8,571,558 B1 * | 10/2013 | Dinan | H04W 36/22 370/331 |

(Continued)

FOREIGN PATENT DOCUMENTS

| | | |
|---|---|---|
| KR | 10-1181257 B1 | 9/2012 |
| KR | 10-1510893 B1 | 4/2015 |

*Primary Examiner* — Ayaz R Sheikh
*Assistant Examiner* — Faiyazkhan Ghafoerkhan
(74) *Attorney, Agent, or Firm* — LRK Patent Law Firm

(57) ABSTRACT

A method of controlling a wireless communication network, performed by a server, includes determining neighbor base stations adjacent to a target base station based on a connection relationship between a plurality of base stations; setting at least two reference base stations based on hop distances between the neighbor base stations; grouping terminals connected to the target base station into at least two groups based on information of the at least two reference base stations, and allocating a different time resource to each of the at least two groups.

18 Claims, 11 Drawing Sheets

(56) References Cited

U.S. PATENT DOCUMENTS

| | | | |
|---|---|---|---|
| 8,812,680 B2* | 8/2014 | Patil | H04W 8/005 709/220 |
| 8,982,770 B2 | 3/2015 | Sugiyama et al. | |
| 9,060,386 B2* | 6/2015 | Cha | H04W 84/18 |
| 2003/0147362 A1* | 8/2003 | Dick | H04B 7/269 370/324 |
| 2008/0108305 A1* | 5/2008 | Lin | H04B 7/2606 455/11.1 |
| 2009/0047968 A1* | 2/2009 | Gunnarsson | H04W 48/12 455/446 |
| 2009/0075587 A1* | 3/2009 | Yu | H04W 72/1231 455/7 |
| 2009/0286465 A1* | 11/2009 | Lin | H04B 7/15507 455/3.01 |
| 2010/0195621 A1* | 8/2010 | Kekki | H04W 48/17 370/332 |
| 2010/0317343 A1* | 12/2010 | Krishnamurthy | H04W 24/10 455/435.1 |
| 2011/0201369 A1* | 8/2011 | Kim | H04W 8/00 455/507 |
| 2012/0201193 A1* | 8/2012 | Sugiyama | H04B 7/155 370/315 |
| 2013/0252626 A1* | 9/2013 | Lee | H04W 72/1231 455/452.1 |
| 2013/0322322 A1* | 12/2013 | Redana | H04W 24/10 370/315 |
| 2014/0036709 A1* | 2/2014 | Madan | H04W 24/10 370/252 |
| 2014/0247797 A1* | 9/2014 | Monzen | H04L 1/0015 370/329 |
| 2014/0301251 A1* | 10/2014 | Chen | H04J 11/005 370/278 |
| 2014/0357287 A1* | 12/2014 | Han | H04B 7/024 455/450 |
| 2015/0092552 A1* | 4/2015 | Bajj | H04W 28/08 370/235 |
| 2015/0201421 A1* | 7/2015 | Park | H04J 11/0056 455/452.1 |
| 2015/0208271 A1* | 7/2015 | Love | H04L 43/0852 370/252 |
| 2015/0327142 A1* | 11/2015 | Martinez Tarradell | H04W 24/10 455/436 |
| 2015/0341941 A1* | 11/2015 | Nguyen | H04W 72/082 370/332 |
| 2015/0372791 A1* | 12/2015 | Zhu | H04L 5/003 370/329 |
| 2016/0128041 A1* | 5/2016 | Jin | H04W 72/048 370/329 |
| 2016/0301492 A1 | 10/2016 | Wilhelmsson et al. | |
| 2016/0353457 A1* | 12/2016 | Park | H04B 7/024 |
| 2018/0124771 A1* | 5/2018 | Mok | H04W 24/10 |
| 2018/0146410 A1* | 5/2018 | Cho | H04W 48/20 |
| 2018/0351668 A1* | 12/2018 | Kim | H04W 52/40 |
| 2019/0013883 A1* | 1/2019 | Tercero Vargas | H04B 7/0617 |
| 2019/0090162 A1* | 3/2019 | Roy | H04W 36/0005 |
| 2019/0174482 A1* | 6/2019 | Mok | H04W 4/44 |

* cited by examiner

FIG. 13

| TERMINAL | CONNECTABLE BASE STATION |
|---|---|
| 0x1 | BS1, BS2, BS3, BS6 |
| 0x2 | BS1, BS2, BS3, BS6 |
| 0x3 | BS1, BS2, BS3, BS5 |
| 0x4 | BS1, BS4, BS5 |
| 0x5 | BS2, BS8 |
| 0x6 | BS2, BS11 |
| 0x7 | BS1, BS2, BS3, BS8 |
| 0x8 | BS3 |
| 0x9 | BS5 |
| 0x10 | BS4, BS5, BS9 |
| 0x11 | BS1, BS3, BS5 |
| 0x12 | BS1, BS2, BS3, BS6 |
| 0x13 | BS1, BS2, BS6 |
| 0x14 | BS1, BS6, BS7 |
| 0x15 | BS1, BS4, BS7 |

FIG. 14

| TERMINAL | CONNECTABLE BASE STATION |
|---|---|
| 0x1 | BS1, BS2, BS3, BS6 |
| 0x4 | BS1, BS4, BS5 |
| 0x12 | BS1, BS2, BS3, BS6 |
| 0x13 | BS1, BS2, BS6 |
| 0x14 | BS1, BS6, BS7 |
| 0x15 | BS1, BS4, BS7 |

METHOD FOR CONTROLLING WIRELESS COMMUNICATION NETWORK AND SERVER THEREFOR

CROSS-REFERENCE TO RELATED APPLICATION

This application claims priority to Korean Patent Application No. 10-2016-0166723, filed Dec. 8, 2016 in the Korean Intellectual Property Office (KIPO), the entire content of which is hereby incorporated by reference.

BACKGROUND

1. Technical Field

The present disclosure relates to a method for controlling a wireless communication network and a server for the same, and more specifically, to technologies for reducing hidden node interferences in a wireless communication network.

2. Description of Related Art

In a star-topology network such as a low power wide area network (LPWAN) comprising a server, at least one gateway (GW), and a plurality of end devices (EDs), an end device may transmit data based on a contention-based access scheme, for example, a listen before talk (LBT) scheme. That is, end devices may transmit their packets after measuring channel states before their data transmission.

However, an end device may not be able to detect signals of other end devices that are actually transmitting their data due to distance, obstacles, or the like. This may cause the end device to erroneously judge a channel state and initiate its transmission. In this case, a receiving base station may fail to receive packets from end devices due to a collision of the packets transmitted from two or more end devices. This may be referred to as a hidden node interference problem (or, simply referred to as 'hidden node problem'), which causes a decrease in communication capacity.

SUMMARY

Accordingly, embodiments of the present disclosure provide a wireless communication control method of a wireless communication server for increasing communication capacity by solving a hidden node interference problem through a virtual sectoring in a contention-based access scheme such as a listen-before-talk (LBT) scheme.

In order to achieve the objective of the present disclosure, a method of controlling a wireless communication network, performed by a server, may comprise determining neighbor base stations adjacent to a target base station based on a connection relationship between a plurality of base stations; setting at least two reference base stations based on hop distances between the neighbor base stations; grouping terminals connected to the target base station into at least two groups based on information of the at least two reference base stations, and allocating a different time resource to each of the at least two groups.

In the setting at least two reference base stations, one of the neighbor base stations may be set as a first reference base station, and a base station having a largest hop distance from the first reference base station among the neighbor base stations may be set as a second reference base station.

In the setting at least two reference base stations, a base station having a largest hop distance from a n-th (n is a natural number equal to or greater than 2) reference base station among the neighbor base stations may be set as a (n+1)-th reference base station, and the setting at least two reference base stations may be repeated until a predetermined termination condition is satisfied.

The setting at least two reference base stations may be repeated until all of the set reference base stations are adjacent to at least one other reference base station.

When there are a plurality of base stations having the largest hop distance from the first reference base station, the plurality of base stations having the largest hop distance from the first reference base station may be set as candidate base stations, and a base station having most adjacent reference base stations among the candidate base stations may be set as the second reference base station.

When there are a plurality of base stations having the largest hop distance from the n-th reference base station, the plurality of base stations having the largest hop distance from the n-th reference base station may be set as candidate base stations, and a base station having most adjacent reference base stations among the candidate base stations may be set as the (n+1)-th reference base station.

Terminals belonging to a same group among the terminals connected to the target base station may transmit data at a same time resource in a contention-based manner.

The terminals connected to the target base station may be grouped into the at least two groups based on information on a list of the reference base stations to which each of the terminals connected to the target base stations is connectable.

The method may further comprise transmitting to the target base station time resource information on the allocated time resources and terminal information on terminals allocated to each of the allocated time resources.

The terminals connected to the target base station may use a different frequency band with terminals connected to the neighbor base stations adjacent to the target base station at a same time resource.

In order to achieve the objective of the present disclosure, an operation method of a terminal in a communication network constituted by a server and a plurality of base stations connected to the server, the operation method may comprise receiving time resource information and terminal information from a target base station among the plurality of base stations; identifying a time resource allocated to the terminal based on the time resource information and terminal information; and transmitting a packet to the target base station based on a listen-before-talk (LBT) scheme at the time resource. Also, the time resource information and the terminal information may be configured by the server through determining neighbor base stations adjacent to the target base station, setting at least two reference base stations based on hop distances between the neighbor base stations, grouping terminals connected to the target base station into at least two groups based on information of the at least two reference base stations, and allocating a different time resource to each of the at least two groups.

In the setting at least two reference base stations, one of the neighbor base stations may be set as a first reference base station, and a base station having a largest hop distance from the first reference base station among the neighbor base stations may be set as a second reference base station.

In the setting at least two reference base stations, a base station having a largest hop distance from a n-th (n is a natural number equal to or greater than 2) reference base station among the neighbor base stations may be set as a (n+1)-th reference base station, and the setting at least two reference base stations may be repeated until a predetermined termination condition is satisfied.

In order to achieve the objective of the present disclosure, a server controlling a wireless communication network may comprise a processor and a memory storing at least one instruction executed by the processor. Also, the at least one instruction may be configured to determine neighbor base stations adjacent to the target base station; set at least two reference base stations based on hop distances between the neighbor base stations; group terminals connected to the target base station into at least two groups based on information of the at least two reference base stations; and allocate a different time resource to each of the at least two groups.

The at least one instruction may be further configured to set one of the neighbor base stations as a first reference base station, and set a base station having a largest hop distance from the first reference base station among the neighbor base stations as a second reference base station.

The at least one instruction may be further configured to set a base station having a largest hop distance from a n-th (n is a natural number equal to or greater than 2) reference base station among the neighbor base stations as a (n+1)-th reference base station, and the setting at least two reference base stations may be repeated until a predetermined termination condition is satisfied.

The setting at least two reference base stations may be repeated until all of the set reference base stations are adjacent to at least one other reference base station.

When there are a plurality of base stations having the largest hop distance from the first reference base station, the at least one instruction may be further configured to set the plurality of base stations having the largest hop distance from the first reference base station as candidate base stations, and set a base station having most adjacent reference base stations among the candidate base stations as the second reference base station.

When there are a plurality of base stations having the largest hop distance from the n-th reference base station, the at least one instruction may be further configured to set the plurality of base stations having the largest hop distance from the n-th reference base station as candidate base stations, and set a base station having most adjacent reference base stations among the candidate base stations as the (n+1)-th reference base station.

The terminals connected to the target base station may use a different frequency band with terminals connected to the neighbor base stations adjacent to the target base station at a same time resource.

According to the above-described embodiments, among terminals connected to a base station, terminals having a high possibility of causing hidden node interferences are classified into different groups, so that hidden node interferences may be reduced. Also, hidden node interferences between terminals connected to adjacent base stations may be reduced.

BRIEF DESCRIPTION OF DRAWINGS

Embodiments of the present disclosure will become more apparent by describing in detail embodiments of the present disclosure with reference to the accompanying drawings, in which:

FIG. 13 is a conceptual diagram illustrating a list of base stations to which each of the terminals shown in FIG. 2 is connectable;

FIG. 14 is a conceptual diagram illustrating a list of base stations to which terminals connected to the base station BS1 are connectable;

DETAILED DESCRIPTION

Figure 1:
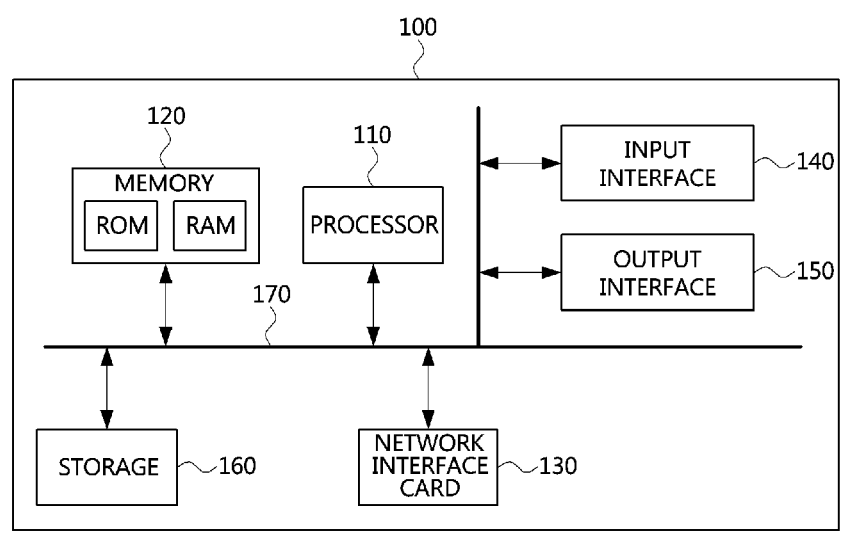
FIG. 1 is a block diagram illustrating an embodiment of a server that performs methods in accordance with the present disclosure.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate a thorough understanding of the present disclosure, the same reference numerals are used for the same constituent elements in the drawings and redundant explanations for the same constituent elements are omitted.

Throughout the specification, a network may be, for example, a low power wide area network (LPWAN), a Zigbee, a wireless fidelity (Wi-Fi), a wireless broadband internet (WiBro), 2G mobile communication networks such as a global system for mobile communication (GSM) or a code division multiple access (CDMA), 3G mobile communication networks such as a wideband code division multiple access (WCDMA) or a CDMA2000, 3.5G mobile communication networks such as a high speed downlink packet access (HSDPA) or a high speed uplink packet access (HSUPA), 4G mobile communication networks such as a long term evolution (LTE) network or an LTE-Advanced network, and 5G mobile communication networks.

Throughout the specification, a terminal may be referred to as a mobile station, a mobile terminal, a subscriber station, a portable subscriber station, a user equipment (UE), an access terminal, or an end-device terminal, and include all or some of functions of the mobile station, the mobile terminal, the subscriber station, the portable subscriber station, the UE, the access terminal, or the end-device terminal.

Here, the terminal may include a sensor that is attached to an object and communicates with the object. The sensor attached to object may be used to implement Internet of Things (IoT). The terminal may be a desktop computer, a laptop computer, a tablet PC, a wireless phone, a mobile phone, a smart phone, a smart watch, smart glasses, an e-book reader, a portable multimedia player (PMP), a portable game machine, a navigation device, a digital camera, a digital multimedia broadcasting (DMB), an audio recorder, a digital audio player, a digital picture recorder, a digital picture player, a digital video recorder, a digital video player, or the like.

Throughout the specification, a base station may be referred to as an access point, a radio access station, a Node-B, an evolved Node B, a base transceiver station, an mobile multi-hop relay (MMR), and may include all or some of the functions of the base station, the access point, the radio access station, the Node-B, the evolved Node-B, the base transceiver station, and the MMR.

FIG. 1 is a block diagram illustrating an embodiment of a server that performs methods in accordance with the present disclosure.

Referring to FIG. 1, a server 100 may comprise at least one processor 110, a memory 120, and a network interface device 130 that is connected to and performs communication with a network. Also, the server 100 may further include an input interface 140, an output interface 150, a storage 160, and the like. Each component included in the server 100 may be connected by a bus 170 and communicate with each other.

The at least one processor 110 may execute program commands stored in the memory 120 and/or the storage 160. The processor 110 may refer to a central processing unit (CPU), a graphics processing unit (GPU), or a dedicated processor on which the methods of the present disclosure are performed. The memory 120 and the storage 160 may be composed of a volatile storage medium and/or a non-volatile storage medium. For example, the memory 120 may be comprised of read only memory (ROM) and/or random access memory (RAM).

In the following description, a wireless communication network to which embodiments according to the present disclosure are applied will be explained. The wireless communication network to which embodiments according to the present disclosure are applied is not limited to the following description, and the embodiments according to the present disclosure may be applied to various wireless communication networks.

Figure 2:
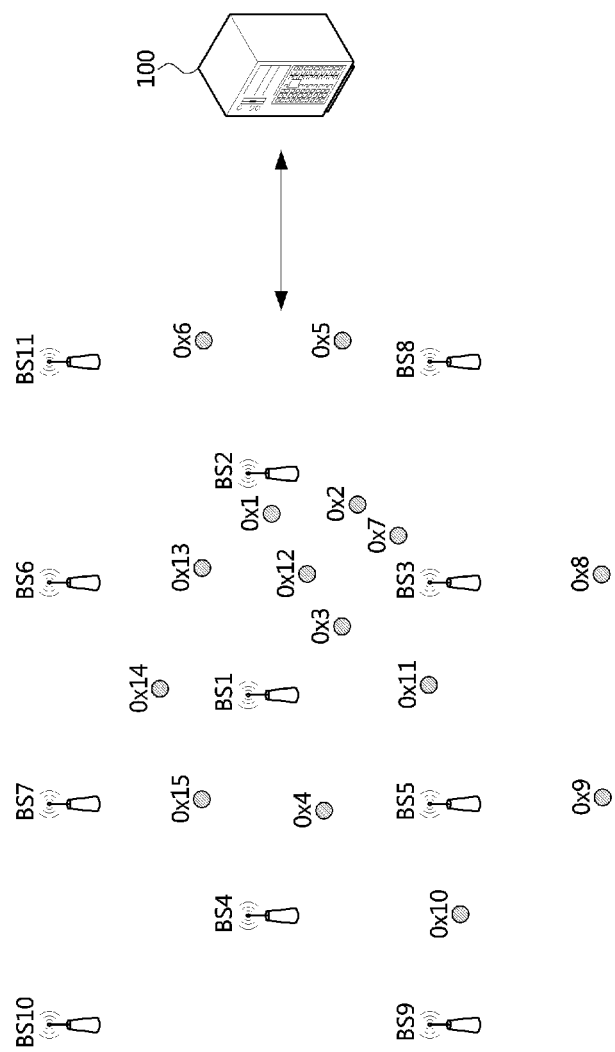
FIG. 2 is a conceptual diagram illustrating an LPWAN-based wireless communication system.

FIG. 2 is a conceptual diagram illustrating an LPWAN-based wireless communication system.

Referring to FIG. 2, an LPWAN-based wireless communication system may comprise a plurality of base stations BS1, BS2, BS3, BS4, BS5, BS6, BS7, BS8, BS9, BS10, and BS11, a plurality of terminals $0x1$, $0x2$, $0x3$, $0x4$, $0x5$, $0x6$, $0x7$, $0x8$, $0x9$, $0x10$, $0x11$, $0x12$, $0x13$, $0x14$, and $0x15$, and a server 100. The number of base stations and the number of terminals illustrated in FIG. 2 are merely illustrative, and embodiments according to the present disclosure are not limited thereto. For example, if the terminals include sensors applied to Internet of thins (IoT), the number of terminals included in the LPWAN-based wireless communication system may reach tens of thousands.

In the LPWAN, since the terminals 0x1, 0x2, 0x3, 0x4, 0x5, 0x6, 0x7, 0x8, 0x9, 0x10, 0x11, 0x12, 0x13, 0x14, and 0x15 communicate at a low bit rate, power consumption thereof may be small. Therefore, battery life of the terminals may be long. Each of the terminals may communicate with each of the base stations BS1, BS2, BS3, BS4, BS5, BS6, BS7, BS8, BS9, BS10, and BS11 in a contention-based access scheme. For example, each of the terminals may measure a channel state before transmitting data, and then transmit the data.

The base stations may receive the date from the terminals via uplink channels, and transmit data to the terminals via downlink channels. Also, the base stations may transmit and receive data with the server 100 via wireless or wired communications.

The server 100 may receive the uplink data received by the base stations. For example, the server 100 may identify that the data transmitted by the terminal 0x1 can be received by the base station BS1, the base station BS2, the base station BS3, and the base station BS6. Also, when there is downlink data to be transmitted to the terminal 0x1, the server 100 may select one of the base stations BS1, BS2, BS3, and BS6, and control the selected base station to transmit the downlink data.

Although FIG. 2 illustrates an example in which the server 100 is separately provided, embodiments are not limited thereto. For example, when a master base station and a slave base station are included in the network, the function of the server 100 may be performed by the master base station. Accordingly, in the present disclosure, the server 100 may include a network central server as well as a master base station.

Figure 3:
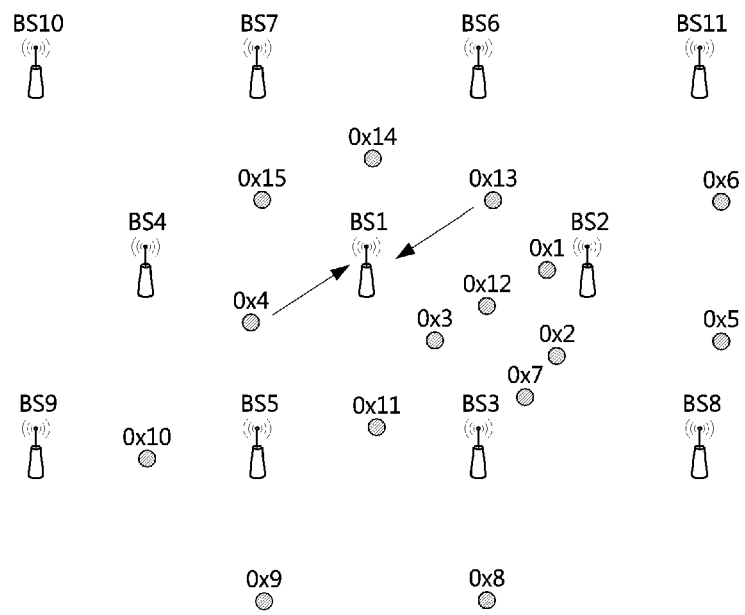
FIG. 3 is a conceptual diagram illustrating hidden node interferences occurring in the LPWAN-based wireless communication system shown in FIG. 2.

FIG. 3 is a conceptual diagram illustrating hidden node interferences occurring in the LPWAN-based wireless communication system shown in FIG. 2.

Referring to FIG. 3, when the terminal 0x4 measures a channel state to transmit data, it may not be able to identify that the terminal 0x13 is also transmitting data. Accordingly, the terminal 0x4 and the terminal 0x13 may simultaneously transmit data. The base station BS1 may not identify signals transmitted by the terminal 0x4 and the terminal 0x13 due to interferences between the signals transmitted from the terminal 0x4 and the terminal 0x13. This problem may be referred to as a hidden node interference problem.

Figure 4:
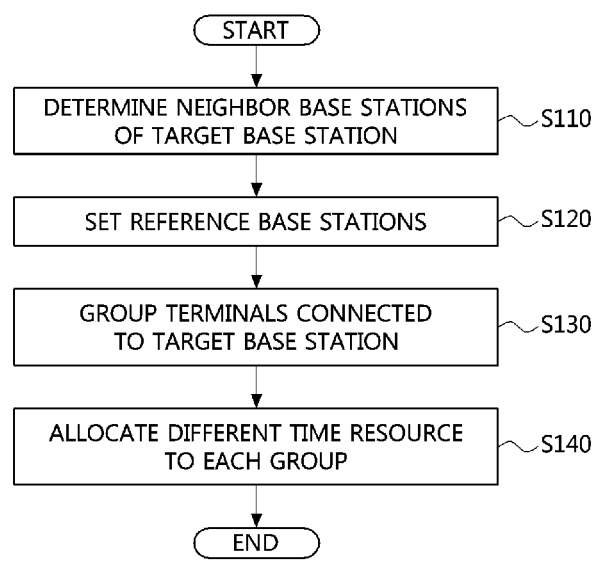
FIG. 4 is a flowchart for explaining a method of controlling a wireless communication network by a server 100 according to an embodiment of the present disclosure.

FIG. 4 is a flowchart for explaining a method of controlling a wireless communication network by a server 100 according to an embodiment of the present disclosure.

Referring to FIGS. 3 and 4, in a step S110, a server 100 may determine, based on a connection relationship between the base stations BS1, BS2, BS3, BS4, BS5, BS6, BS7, BS8, BS9, BS10, and BS11, neighbor base stations BS2, BS3, BS4, BS5, BS6, and BS7 adjacent to a target base station BS1. The target base station may mean a base station for which the server 100 performs grouping of terminals connected thereto. Also, a meaning that two base stations are adjacent to each other may be that a hop distance between the two base stations is one hop distance.

The server 100 may set all of the base stations BS1, BS2, BS3, BS4, BS5, BS6, BS7, BS8, BS9, BS10, and BS11 as target base stations. In this case, the server 100 may group terminals connected to each of the base stations BS1, BS2, BS3, BS4, BS5, BS6, BS7, BS8, BS9, BS10, and BS11 into a plurality of groups, and allocate a different time resource to each group. As another example, the server 100 may set at least one base station among the base stations BS1, BS2, BS3, BS4, BS5, BS6, BS7, BS8, BS9, BS10, and BS11, which have possibility of causing hidden node interferences, as the target base station. In this case, the server 100 may group the terminals connected to the at least one base station set as the target base station into a plurality of groups and allocate a different time resource to each group. In the present disclosure, an example in which the base station BS1 is assumed as the target base station and the server 100 groups terminals connected to the base station BS1 will be described.

The server 100 may allocate a time resource for each terminal group, and may transmit, to at least one base station, time resource information on the allocated time resources and terminal information (e.g., terminal identifiers) on terminals allocated to each of the time resources. The base station may transmit the time resource information and the terminal information to terminals connected to itself. The terminals connected to the target base station may transmit data using the time resource information and terminal information received from the base station.

The connection relationship between the base stations BS1, BS2, BS3, BS4, BS5, BS6, BS7, BS8, BS9, BS10, and BS11 may be determined based on hop distances between the base stations BS1, BS2, BS3, BS4, BS5, BS6, BS7, BS8, BS9, BS10, and BS11. For example, the server 100 may determine the connection relationship by identifying which base stations receive a beacon transmitted by each of the base stations. In another example, the connection relationship between the base stations BS1, BS2, BS3, BS4, BS5, BS6, BS7, BS8, BS9, BS10, and BS11 may be stored in the server 100 in advance by a network administrator.

Figure 5:
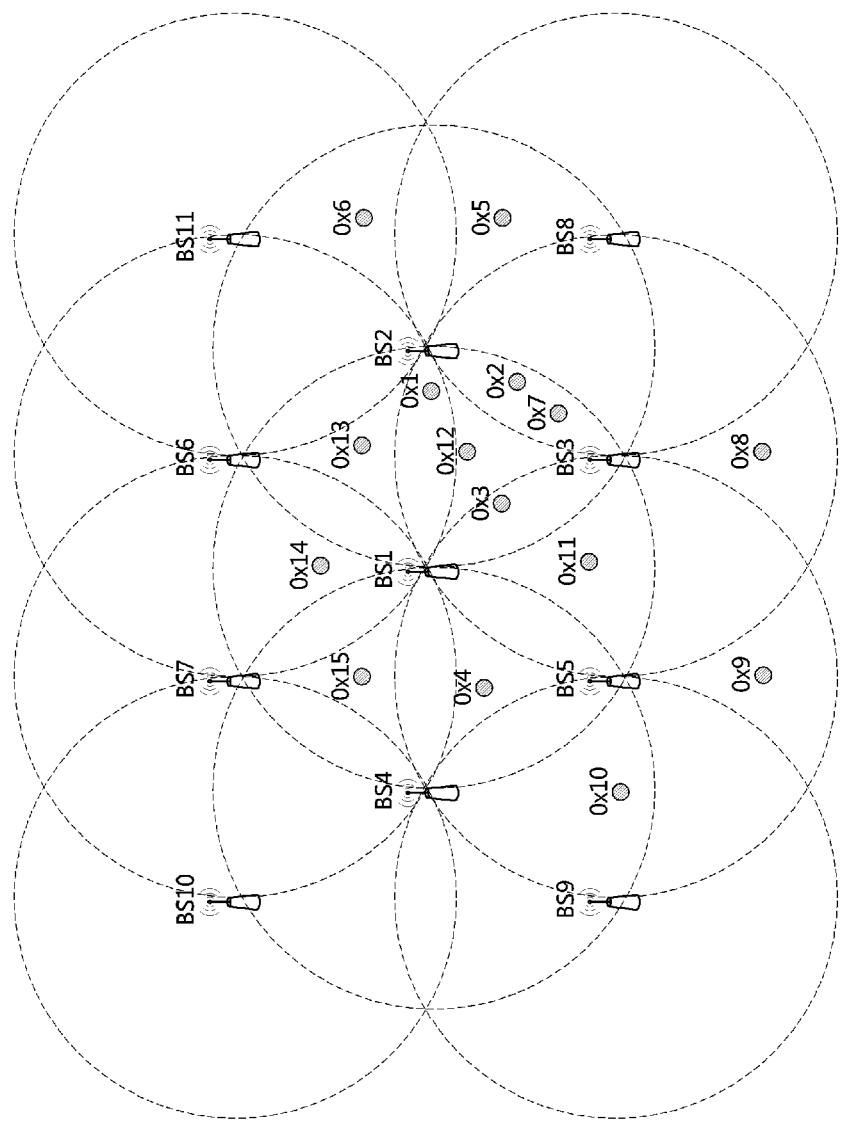
FIG. 5 is a conceptual diagram illustrating coverage of each of the base stations BS1, BS2, BS3, BS4, BS5, BS6, BS7, BS8, BS9, BS10, and BS11.

FIG. 5 is a conceptual diagram illustrating coverage of each of the base stations BS1, BS2, BS3, BS4, BS5, BS6, BS7, BS8, BS9, BS10, and BS11.

Referring to FIG. 5, base stations BS2, BS3, BS4, BS5, BS6, and BS7 may be included in coverage of the base station BS1. The server 100 may identify which base stations receive a beacon transmitted by the base station BS1. From this, the server 100 may identify which base stations are in the coverage of the base station BS1. Likewise, base stations BS1, BS3, BS8, BS11, and BS6 may be identified as included in coverage of the base station BS2. That is, the server 100 may identify which base stations are in the coverage of the base station BS2 based on which base stations receive a beacon transmitted by the base station BS2.

In the manner as described above, the server 100 may identify which base stations are included in coverage of each base station. Also, the connection relationship between the base stations BS1, BS2, BS3, BS4, BS5, BS6, BS7, BS8, BS9, BS10, and BS11 which are included in the network may be determined based on the information on the base stations adjacent to each base station.

Figure 6:
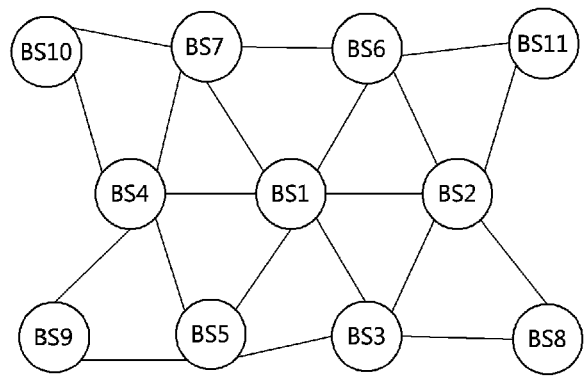
FIG. 6 is a conceptual diagram illustrating a connection relationship between base stations BS1, BS2, BS3, BS4, BS5, BS6, BS7, BS8, BS9, BS10, and BS11.

FIG. 6 is a conceptual diagram illustrating a connection relationship between base stations BS1, BS2, BS3, BS4, BS5, BS6, BS7, BS8, BS9, BS10, and BS11.

In FIG. 6, each line segment represents one hop distance. For example, a hop distance between the base stations BS1 and BS7 is one, and a hop distance between the base stations BS1 and BS10 is two. For example, neighbor base stations of the base station BS1 which is the target base station may include the base stations BS2, BS3, BS4, BS5, BS6, and BS7.

Matrix 1 below is a matrix representing the connection relationship between the base stations BS1, BS2, BS3, BS4, BS5, BS6, BS7, BS8, BS9, BS10, and BS11.

$$\begin{bmatrix} 1 & 1 & 1 & 1 & 1 & 1 & 1 & 0 & 0 & 0 & 0 \\ 1 & 1 & 1 & 0 & 0 & 1 & 0 & 1 & 0 & 0 & 1 \\ 1 & 1 & 1 & 0 & 1 & 0 & 0 & 1 & 0 & 0 & 0 \\ 1 & 0 & 0 & 1 & 1 & 0 & 1 & 0 & 1 & 1 & 0 \\ 1 & 0 & 1 & 1 & 1 & 0 & 0 & 0 & 1 & 0 & 0 \\ 1 & 1 & 0 & 0 & 0 & 1 & 1 & 0 & 0 & 0 & 1 \\ 1 & 0 & 0 & 1 & 0 & 1 & 1 & 0 & 0 & 1 & 0 \\ 0 & 1 & 1 & 0 & 0 & 0 & 0 & 1 & 0 & 0 & 0 \\ 0 & 0 & 0 & 1 & 1 & 0 & 0 & 0 & 1 & 0 & 0 \\ 0 & 0 & 0 & 1 & 0 & 0 & 1 & 0 & 0 & 1 & 0 \\ 0 & 1 & 0 & 0 & 0 & 1 & 0 & 0 & 0 & 0 & 1 \end{bmatrix} \quad \text{[Matrix 1]}$$

In Matrix 1, a horizontal index and a vertical index may indicate identification numbers of the corresponding base stations. Also, each element of the matrix may indicate a connection between the corresponding base stations. For example, '1' means that the corresponding base stations are adjacent to each other, and '0' means that the corresponding base stations are not adjacent to each other. For convenience, the connection relation to the base station itself is indicated as '1'. For example, the element in the first row and second column may represent a connection relation between the base station BS1 and the base station BS2. As shown in FIG. 6, since the base station BS1 and the base station BS2 are adjacent to each other, the value of the element in the first row and second column is set to '1'. As another example, the element in the first row and eighth column may represent a connection relation between the base station BS1 and the base station BS8. Since the base station BS1 and the base station BS8 are not adjacent to each other, the value of the element in the first row and eighth column is set to '0'. The server 100 may store the connection relationship between the base stations as shown in Matrix 1.

The hop distances between the base stations BS1, BS2, BS3, BS4, BS5, BS6, BS7, BS8, BS9, BS10, and BS11 shown in FIG. 6 may be represented as Matrix 2 below.

$$\begin{bmatrix} 1 & 1 & 1 & 1 & 1 & 1 & 1 & 2 & 2 & 2 & 2 \\ 1 & 1 & 1 & 2 & 2 & 1 & 2 & 1 & 3 & 3 & 1 \\ 1 & 1 & 1 & 2 & 1 & 2 & 2 & 1 & 2 & 3 & 2 \\ 1 & 2 & 2 & 1 & 1 & 2 & 1 & 3 & 1 & 1 & 3 \\ 1 & 2 & 1 & 1 & 1 & 2 & 2 & 2 & 1 & 2 & 3 \\ 1 & 1 & 2 & 2 & 2 & 1 & 1 & 2 & 3 & 2 & 1 \\ 1 & 2 & 2 & 1 & 2 & 1 & 1 & 3 & 2 & 1 & 2 \\ 2 & 1 & 1 & 3 & 2 & 2 & 3 & 1 & 3 & 4 & 2 \\ 2 & 3 & 2 & 1 & 1 & 3 & 2 & 3 & 1 & 2 & 4 \\ 2 & 3 & 3 & 1 & 2 & 2 & 1 & 4 & 2 & 1 & 3 \\ 2 & 1 & 2 & 3 & 3 & 1 & 2 & 2 & 4 & 3 & 1 \end{bmatrix} \quad \text{[Matrix 2]}$$

In Matrix 2, a horizontal index and a vertical index may indicate identification numbers of the corresponding base stations. Also, each element of the matrix may indicate a hop distance between the corresponding base stations. For convenience, a hop distance relation to the base station itself is indicated as '1'. For example, the element in the first row and second column may represent a hop distance between the base station BS1 and the base station BS2. As shown in FIG. 6, since the base stations BS1 and BS2 are adjacent to each other and their hop distance is one, the value of the element in the first row and second column is set to '1'. As another example, the element in the first row and eighth column may represent a hop distance between the base station BS1 and the base station BS8. Since the hop distance between the base stations BS1 and BS8 is two, the value of the element in the first row and eighth column is set to '2'. The server 100 may store the hop distances between the base stations as shown in Matrix 2.

Figure 7:
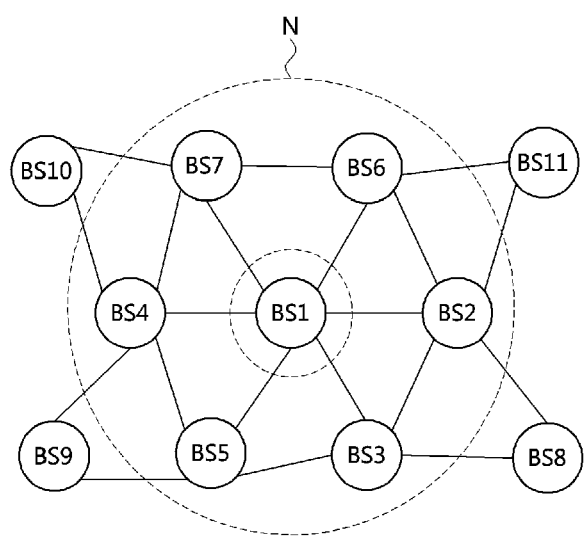
FIG. 7 is a conceptual diagram illustrating a set N of base stations BS2, BS3, BS4, BS5, BS6, and BS7 which are adjacent to the base station BS1.

FIG. 7 is a conceptual diagram illustrating a set N of base stations BS2, BS3, BS4, BS5, BS6, and BS7 which are adjacent to the base station BS1.

Referring to FIG. 7, the server 100 may determine a set N of neighbor base stations adjacent to the base station BS1 based on the connection relationship shown in FIG. 6. The set N may include the base station BS2, BS3, BS4, BS5, BS6 and BS7.

Referring back to FIG. 4, in a step S120, the server 100 may set at least two reference base stations based on the hop distances between adjacent neighbor base stations BS2, BS3, BS4, BS5, BS6, and BS7 included in the set N. For example, the server 100 may determine an arbitrary base station in the set N as a first reference base station. Here, it may be assumed that the server 100 set the base station BS2 as the first reference base station. When the server 100 determines the first reference base station (i.e., BS2), a base station having the largest hop distance from the first reference base station may be set as a second reference base station among the base stations BS2, BS3, BS4, BS5, BS6, and BS7 included in the set N.

Figure 8:
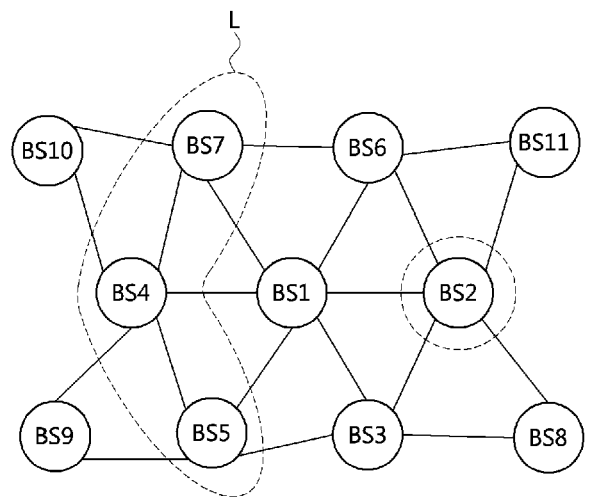
FIG. 8 is a conceptual diagram illustrating a set of base stations BS4, BS5, and BS7 having the largest hop distance from the first reference base station among neighbor base stations BS2, BS3, BS4, BS5, BS6, and BS7.

FIG. 8 is a conceptual diagram illustrating a set of base stations BS4, BS5, and BS7 having the largest hop distance from the first reference base station among neighbor base stations BS2, BS3, BS4, BS5, BS6, and BS7.

Referring to FIG. 8, base stations BS4, BS5 and BS7, among the neighbor base stations BS2, BS3, BS4, BS5, BS6, and BS7 of the base station BS1, may be separated from the first reference base station (i.e., BS2) by two hop distances, respectively. That is, a plurality of base stations having the largest hop distance from the first reference base station may exist in the set N. In this case, the server 100 may set the base stations BS4, BS5 and BS7 having the largest hop distance from the first reference base station in the set N as candidate base stations. Also, one base station may be set as a second reference base station in a set L of the candidate base stations.

For example, the server 100 may set, as the second reference base station, a base station having the largest number of adjacent base stations within the set L of candidate base stations. In this case, the base station BS7 in the set L is adjacent to the base station BS4, the base station BS5 is adjacent to the base station BS4, and the base station BS4 is adjacent to the base stations BS5 and BS7. Since the number of the base stations adjacent to the base station BS4 in the set L is the greatest, the server 100 may set the base station BS4 as the second reference base station. As described above, a step of setting the reference base station may be performed more stably by considering the number of base stations adjacent to each of the base stations in the set L of the candidate base stations. Here, a meaning that the step is more stable may be that a possibility of infinite repetition error is small.

In the above description, illustratively, the server 100 was explained to set the second reference base station from the set L, but embodiments are not limited thereto. For example, the server 100 may arbitrarily set any one of the candidate base stations BS4, BS5, and BS7 as the second reference base station.

In the above description, a process in which the server 100 determines the first reference base station, and determines the second reference base station based thereon was described. In the same manner, the server 100 may set a plurality of reference base stations in a recursive manner. The server 100 may set a base station having the largest hop distance from the n-th reference base station among the adjacent base stations BS2, BS3, BS4, BS5, BS6, and BS7 of the base station BS1 as the (n+1)-th reference base station. In case that there are a plurality of candidate base stations for the (n+1)-th reference base station, the server 100 may set one of the candidate base stations for the (n+1)-th reference base station as the (n+1)-th reference base station. The above process may be repeated until a predetermined termination condition is satisfied. The predetermined termination condition will be described later in more detail.

Figure 9:
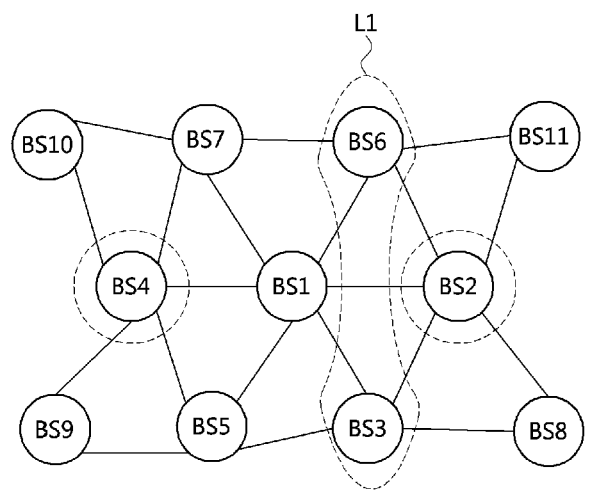
FIG. 9 is a conceptual diagram illustrating a process in which the server 100 sets a third reference base station from the second reference base station.

FIG. 9 is a conceptual diagram illustrating a process in which the server 100 sets a third reference base station from the second reference base station.

Referring to FIG. 9, among the neighbor base stations BS2, BS3, BS4, BS5, BS6, and BS7 of the base station BS1, the server 100 may set a base station having the largest hop distance from the second reference base station (i.e., BS4) as the third reference base station. As shown in FIG. 9, there may be a plurality of base stations having the largest hop distance from the second reference base station (i.e., BS4) among the neighbor base stations BS2, BS3, BS4, BS5, BS6, and BS7 of the base station BS1. For example, the base stations BS2, BS3, and BS6 may have the largest hop distance from the second reference base station (i.e., BS4) among the neighbor base stations BS2, BS3, BS4, BS5, BS6, and BS7.

Thus, the server 100 may set the base stations BS3 and BS6 as candidate base stations for the third reference base station, except the base station BS2 already set as the reference base station among the base stations BS2, BS3 and BS6. In a set L1 of the candidate base stations for the third reference base station, any candidate base station may not be adjacent to other reference base stations. In this case, the server 100 may arbitrarily set any of the base stations BS3 and BS6 as the third reference base station. For example, the server 100 may set the base station BS3 as the third reference base station.

Figure 10:
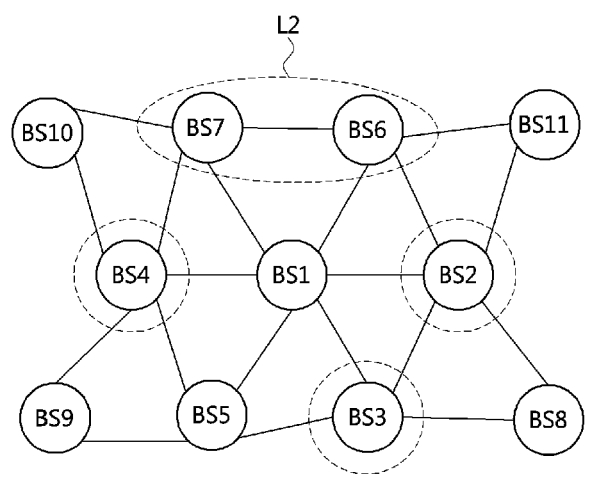
FIG. 10 is a conceptual diagram illustrating a process in which the server 100 sets a fourth reference base station from the third reference base station.

FIG. 10 is a conceptual diagram illustrating a process in which the server 100 sets a fourth reference base station from the third reference base station.

Referring to FIG. 10, among the neighbor base stations BS2, BS3, BS4, BS5, BS6, and BS7 of the base station BS1, the server 100 may set a base station having the largest hop distance from the third reference base station (i.e., BS3) as the fourth reference base station. As shown in FIG. 10, there may be a plurality of base stations having the largest hop distance from the third reference base station (i.e., BS3) among the neighbor base stations BS2, BS3, BS4, BS5, BS6, and BS7 of the base station BS1. For example, the base stations BS4, BS6, and BS7 may have the largest hop distance from the third reference base station (i.e., BS3) among the neighbor base stations BS2, BS3, BS4, BS5, BS6, and BS7.

Figure 11:
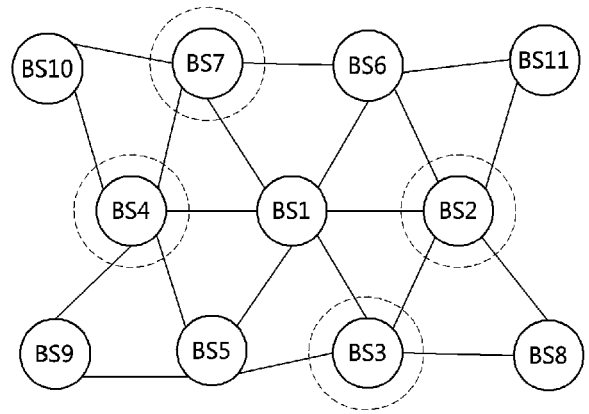
FIG. 11 is a conceptual diagram illustrating reference base stations set by the server.

FIG. 11 is a conceptual diagram illustrating reference base stations set by the server.

Referring to FIG. 11, except for the base station BS4 already set as the reference base station among the base stations BS4, BS6, and BS7, the base stations BS6 and BS7 may be set as candidate base stations for the fourth reference base station. The base stations BS6 and BS7, in a set L2 of the candidate base stations for the fourth reference base station, may all have an adjacent base station. In this case, the server 100 may arbitrarily set any of the base stations BS6 and BS7 as the fourth reference base station. For example, the server 100 may set the base station BS7 as the fourth reference base station, as shown in FIG. 11.

The process of setting the reference base stations may be terminated when the predetermined termination condition is satisfied. For example, the process of setting the reference base stations may be repeated until all the set reference base stations are adjacent to at least one other reference base station.

Referring again to FIG. 9, in the state that the base station BS2 is set as the first reference base station and the base station BS4 is set as the second reference base station, the base stations BS2 and BS4 have a hop distance of two and are not adjacent to each other so that the server 100 may further set the third reference base station.

Referring again to FIG. 10, in the state that the base station BS2 is set as the first reference base station, the base station BS4 is set as the second reference base station, and the base station BS3 is set as the third reference base station, the base stations BS2 and BS3 are adjacent to each other, but there is not a reference base station adjacent to the base station BS4 so that the server 100 may further set the fourth reference base station.

Referring again to FIG. 11, in the state that the base station BS2 is set as the first reference base station, the base station BS4 is set as the second reference base station, the base station BS3 is set as the third reference base station, and the base station BS7 is set as the third reference base station, all the reference base stations are adjacent to at least one other reference base station. Thus, the server 100 may terminate the process of setting the reference base station without setting any further reference base station.

The predetermined termination condition for setting the reference base station is not limited to the example described above. For example, the server 100 may repeat setting the reference base station until a predetermined number is satisfied. Also, the server 100 may repeat the process of setting the reference base station until a predetermined ratio of the adjacent base stations of the target base station is set as the reference base stations.

Referring back to FIG. 4, in a step S130, the server 100 may group the terminals connected to the target base station into a plurality of groups based on the information of the set reference base stations. The server 100 may group the terminals by matching the terminals connected to the target base station to the reference base stations.

Figure 12:
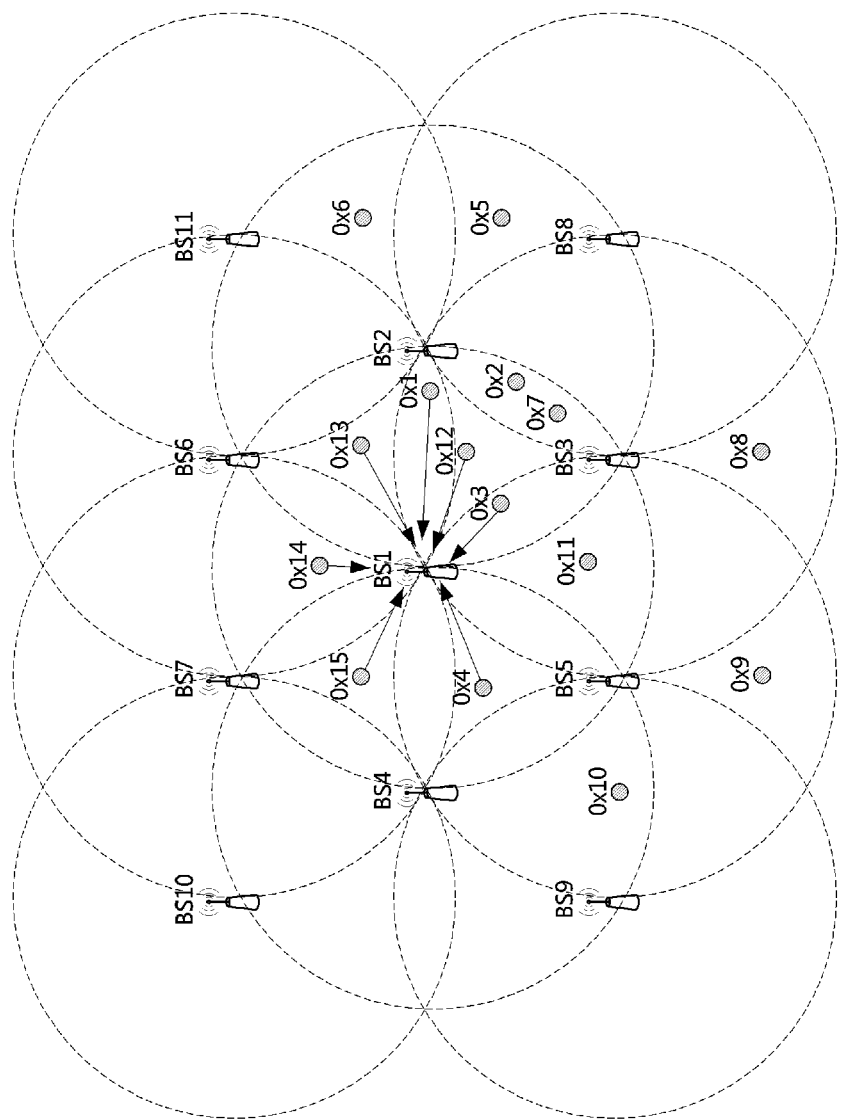
FIG. 12 is a conceptual diagram illustrating terminals $0x1$, $0x3$, $0x4$, $0x12$, $0x13$, $0x14$, and $0x15$ connected to the base station BS1.

FIG. 12 is a conceptual diagram illustrating terminals $0x1$, $0x3$, $0x4$, $0x12$, $0x13$, $0x14$, and $0x15$ connected to the base station BS1.

Referring to FIG. 12, terminals $0x1$, $0x3$, $0x4$, $0x12$, $0x13$, $0x14$, and $0x15$ among the terminals $0x1$, $0x2$, $0x3$, $0x4$, $0x7$, $0x11$, $0x12$, $0x13$, $0x14$, and $0x15$ located within the coverage of the base station BS1 may be connected to the base station BS1. The terminals $0x2$, $0x7$ and $0x11$ belong to the coverage of the base station BS1, but may be connected to other base stations. The server 100 may determine which terminal will connect to the base station BS1 among the terminals $0x1$, $0x2$, $0x3$, $0x4$, $0x7$, $0x11$, $0x12$, $0x13$, $0x14$, and $0x15$ located within the coverage of the base station BS1. Of course, the server 100 may allow all the terminals in the coverage of the base station BS1 to be connected to the base station BS1.

When the grouping by the server 100 is not performed, the terminals $0x1$, $0x3$, $0x4$, $0x12$, $0x13$, $0x14$, and $0x15$ connected to the base station BS1 may transmit data in a contention-based manner. In this case, hidden node interferences may occur. The server 100 may group the terminals connected to the base station BS1 into a plurality of groups based on information on the reference base stations BS2, BS3, BS4, and BS7.

The server 100 may make the reference base stations BS2, BS3, BS4, and BS7 for the base station BS1 be references of respective groups. The server 100 may match the terminals 0x1, 0x3, 0x4, 0x12, 0x13, 0x14, and 0x15 connected to the base station BS1 to each of the reference base stations BS2, BS3, BS4 and BS7. The server 100 may match the terminals 0x1, 0x3, 0x4, 0x12, 0x13, 0x14, and 0x15 connected to the base station BS1 to each of the reference base stations BS2, BS3, BS4 and BS7 based on information of a list of base stations to which each of the terminals 0x1, 0x3, 0x4, 0x12, 0x13, 0x14, and 0x15 is connectable.

FIG. 13 is a conceptual diagram illustrating a list of base stations to which each of the terminals shown in FIG. 2 is connectable.

Referring to FIG. 13, the server 100 may store a list of base stations to which each of the terminals is connectable. The list of base stations to which each of the terminals can be connected may be stored in advance in the server 100 by the network administrator. As another example, the server 100 may obtain a list as shown in FIG. 13 by identifying which base stations can receive a signal transmitted by each of the terminals. For example, the server 100 may identify that the base stations BS1, BS2, BS3, and BS6 can receive the signal transmitted by the terminal 0x01 based on uplink data received from the base stations. From this, the server 100 may identify that the base stations BS1, BS2, BS3, and BS6 are included in the base stations to which the terminal 0x1 is connectable. In the same way, the server 100 may identify base stations to which each terminal is connectable, and obtain the list information as shown in FIG. 13.

FIG. 14 is a conceptual diagram illustrating a list of base stations to which terminals connected to the base station BS1 are connectable.

Referring to FIG. 14, the server 100 may match each of the terminals 0x1, 0x3, 0x4, 0x12, 0x13, 0x14, and 0x15 to each reference base station based on the information of base stations to which each of the terminals 0x1, 0x3, 0x4, 0x12, 0x13, 0x14, and 0x15 is connectable. For example, since the terminal 0x04 is connectable to the second reference base station (i.e., BS4), the server 100 may match the terminal 0x04 to the second reference base station. Also, since the terminal 0x13 is connectable to the first reference base station (i.e., BS2), the server 100 may match the terminal 0x13 to the first reference base station. Also, since the terminal 0x14 is connectable to the fourth reference base station (i.e., BS7), the server 100 may match the terminal 0x14 to the fourth reference base station.

The terminal 0x1 is connectable to the first reference base station (i.e., BS2) and the third reference base station (i.e., BS3). Accordingly, the server 100 may match the terminal 0x1 to any one of the first reference base station and the third reference base station. Which reference base station is to be matched may be determined in consideration of load balancing or Quality of Service (QoS), but embodiments are not limited thereto. For example, the server 100 may randomly select one of the reference base stations to which the terminal 0x1 is connectable and match the terminal 0x1 to the selected reference base station. In the present disclosure, it may be assumed that the terminal 0x1 is matched to the first reference base station (i.e., BS2) as an example.

The terminal 0x12 is connectable to the first reference base station (i.e., BS2) and the third reference base station (i.e., BS3). In the same manner, the server 100 may select one of the reference base stations to which the terminal 0x12 is connectable, and match the terminal 0x12 to the selected reference base station. For example, it may be assumed that the terminal 0x12 is matched to the third reference base station (i.e., BS3). The terminal 0x15 is connectable to the second reference base station (i.e., BS4) and the fourth reference base station (i.e., BS7). In the same manner, the server 100 may select one of the reference base stations to which the terminal 0x15 is connectable, and match the terminal 0x15 to the selected reference base station. For example, it may be assumed that the terminal 0x15 is matched to the third second base station (i.e., B4).

Figure 15:
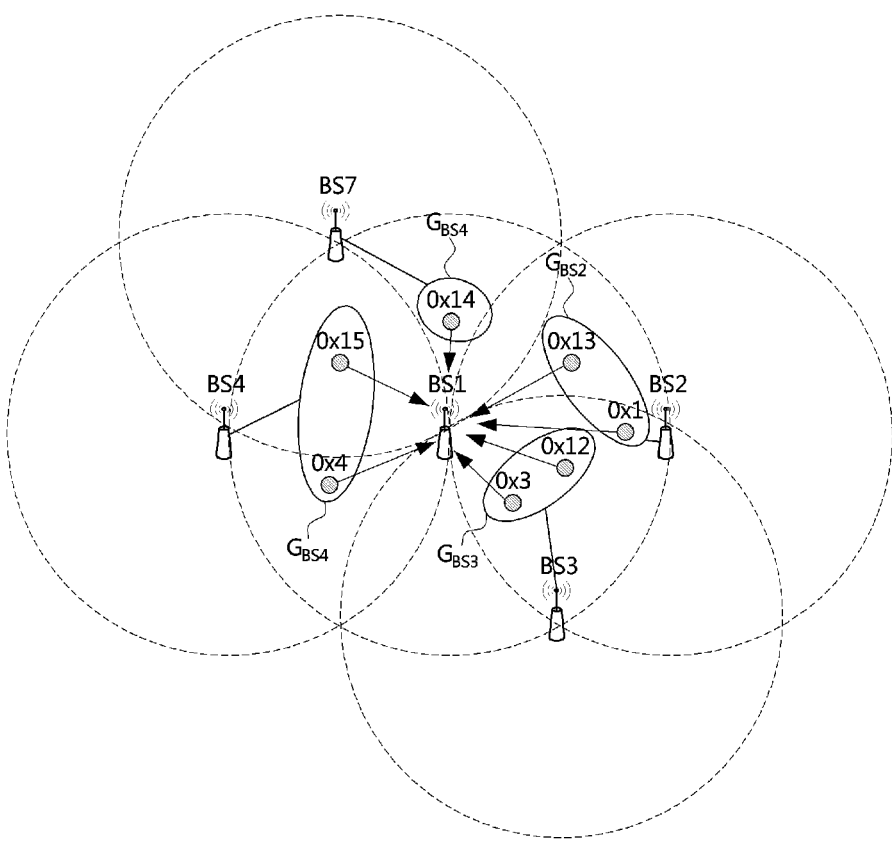
FIG. 15 is a conceptual diagram illustrating a result of grouping of terminals $0x1$, $0x3$, $0x4$, $0x12$, $0x13$, $0x14$, and $0x15$ to access the base station BS1 by the server 100.

FIG. 15 is a conceptual diagram illustrating a result of grouping of terminals 0x1, 0x3, 0x4, 0x12, 0x13, 0x14, and 0x15 to access the base station BS1 by the server 100.

Referring to FIG. 15, the terminals 0x1, 0x3, 0x4, 0x12, 0x13, 0x14, and 0x15 connected to the first base station BS1 may be grouped as follows.

GBS2={0x1, 0x13}
GBS3={0x3, 0x12}
GBS4={0x4, 0x15}
GBS7={0x14}

According to the above grouping, terminals with high possibility of causing hidden node interferences may be grouped into different groups. For example, as shown in FIG. 3, there is a possibility that the terminal 0x13 and the terminal 0x4 may not detect a signal transmitted from each other thereby causing the hidden node interferences. By the grouping, the terminal 0x13 may be grouped into the GBS2 group, and the terminal 0x4 may be grouped into the GBS4 group. That is, terminals with high possibility of causing hidden node interferences among one another may be classified into different groups. On the other hand, terminals with low probability of causing hidden node interferences may be classified into the same group.

Figure 16:
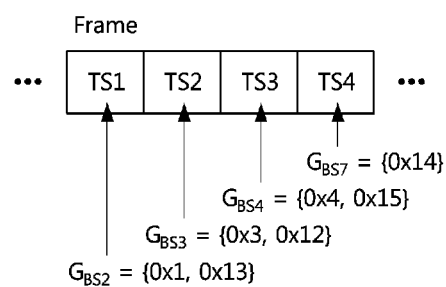
FIG. 16 is a conceptual diagram illustrating that the server 100 allocates a different time resource for each group.

FIG. 16 is a conceptual diagram illustrating that the server 100 allocates a different time resource for each group.

Referring to FIG. 16, the server 100 may allocate a different time resource for each terminal group. The server 100 may complete the grouping procedure for the terminals 0x1, 0x3, 0x4, 0x12, 0x13, 0x14, and 0x15 which are connected to the base station BS1, and allocate a different time resource for each group. The server 100 may transmit time resource information on the allocated time resources and terminal information (e.g., terminal identifiers) on terminals allocated each of the time resources to at least one of the base stations. The base station receiving the time resource information and the terminal information may transmit the time resource information and the terminal information to terminals belonging to itself. The terminals connected to the target base station may transmit data using the time resource information and terminal information received from the base station.

The server 100 may allocate a different time slot for each group. For example, the server 100 may allocate a first time slot TS1 to the group GBS2, allocate a second time slot TS2 to the group GBS3, allocate a third time slot TS3 to the group GBS4, and allocate a fourth time slot TS4 to the group GBS7. The example illustrated in FIG. 16 is merely an example and embodiments are not limited thereto. For example, the order of the time resources allocated to the groups by the server 100 may vary. Also, the size of the time resource allocated to each group by the server 100 may be different from each other. For example, the server 100 may allocate a smaller time resource to the group GBS7 than the group GBS2.

The terminals of the group that are allocated the same time resource may transmit data in a contention-based manner. At the same time resource, the terminal may transmit data based on a listen-before-talk (LBT) scheme. For example, the terminals 0x1 and 0x13 included in the group GBS2 may transmit data in a contention-based manner at the same time resource. The terminal 0x1 and the terminal 0x13 may transmit a signal after confirming whether there is a signal transmitted by each other terminal. According to the grouping method of the server 100 as described above, the same group may include terminals with less possibility of hidden node interference. Therefore, even if the terminal 0x1 and the terminal 0x13 transmit signals in the contention-based manner at the same time resource, hidden node interferences may not occur.

On the other hand, terminals with high possibility of causing hidden node interferences may be included in different groups. Since the process of setting the reference base stations is performed based on the hop distances between the adjacent base stations, the terminals with high hidden node interferences may be matched to the different reference base stations. For example, the terminal 0x13 and the terminal 0x4 may have a high possibility of causing hidden node interferences. The terminal 0x13 may be matched to the first reference base station (i.e., BS2), and the terminal 0x4 may be matched to the second reference base station (i.e., BS4). That is, the terminal 0x13 and the terminal 0x4 may be included in different groups. Therefore, terminals with high probability of causing hidden node interferences may transmit signals at different time resources, thereby reducing hidden node interferences.

In the above description, the target base station is referred to as the base station BS1 and the server 100 groups the terminals connected to the base station BS1. The server 100 may group not only terminals connected to the base station BS1 but also terminals connected to other base stations. For example, the server 100 may set each of all the base stations as the target base station, and group the terminals connected to each target base station. As another example, the server 100 may set only the base stations that are highly likely to cause hidden node interference to the target base stations, and group the terminals connected to each of the target base stations. Hidden node interference may not occur between terminals connected to the same base station by the grouping of the server 100. Also, by setting some of the base stations adjacent to the target base station as the reference base stations, it is possible to prevent the number of groups in which the terminals are grouped from becoming excessively large. That is, it is possible to prevent an excessive increase in the number of time resources divided by the grouping. Also, the complexity of the grouping method may be lowered.

Figure 17:
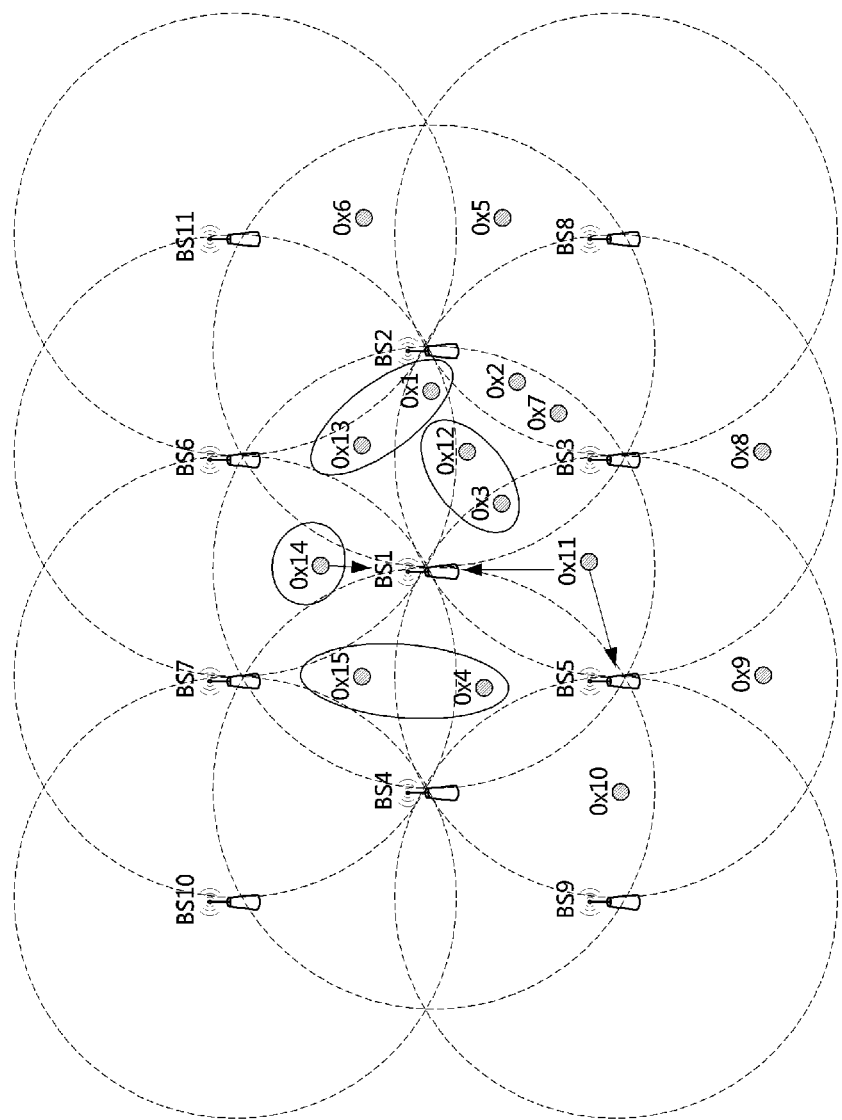
FIG. 17 is a conceptual diagram illustrating a hidden node interference problem that may occur between terminals connected to different base stations.

FIG. 17 is a conceptual diagram illustrating a hidden node interference problem that may occur between terminals connected to different base stations.

Referring to FIG. 17, hidden node interferences may not occur due to grouping of terminals 0x1, 0x3, 0x4, 0x12, 0x13, 0x14, and 0x15 connected to the base station BS1. However, when the terminal 0x11 in the coverage of the base station BS1 is classified as the terminal connected to the base station BS5, the terminal 0x11 may cause a hidden node interference problem with a part of the terminals connected to the base station BS1. For example, the base station BS1 may not be able to identify data transmitted by the terminal 0x14 due to hidden node interferences occurring between the terminal 0x11 and the terminal 0x14.

In order to solve the above-described problem, the server 100 may make the terminals connected to different adjacent base stations use different frequency bands in the same time resource. This may be expressed by Equation 1 below.

$$f_{ij} \neq f_{ik} \quad \text{[Equation 1]}$$

In Equation 1, $f_{ij}$ denotes a frequency band used by terminals connected to the j-th base station in the i-th time slot, and $f_{ik}$ denotes a frequency band used by terminals connected to the k-th base station in the i-th time slot. The index k indicates an index of the base stations adjacent to the j-th base station.

By satisfying the condition of Equation 1, hidden node interference occurring between terminals connected to different base stations may be reduced. For example, the frequency band used by the terminal 0x14 connecting to the base station BS1 in the time slot TS4 is different from the frequency band used by the terminal 0x11 connecting the base station BS5 in the time slot TS4. Therefore, hidden node interference may not occur between the terminal 0x14 and the terminal 0x11.

In the above description, referring to FIGS. 1 to 17, a server apparatus and a method of controlling a wireless network performed by the server apparatus according to the embodiments of the present disclosure were described. According to the above-described embodiments, among terminals connected to a base station, terminals having a high possibility of causing hidden node interference are classified into different groups, so that hidden node interference may be reduced. Also, hidden node interference between terminals connected to adjacent base stations may be reduced.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. A method of controlling a wireless communication network, performed by a server, the method comprising:
   determining neighbor base stations adjacent to a target base station based on a connection relationship between a plurality of base stations;
   setting at least two reference base stations based on hop distances between the neighbor base stations;
   grouping terminals connected to the target base station into at least two groups based on information on a list of the reference base stations to which each of the terminals connected to the target base stations is connectable, and allocating a different time resource to each of the at least two groups.

2. The method according to claim 1, wherein, in the setting at least two reference base stations, one of the neighbor base stations is set as a first reference base station, and a base station having a largest hop distance from the first reference base station among the neighbor base stations is set as a second reference base station.

3. The method according to claim 2, wherein:
in the setting at least two reference base stations, a base station having a largest hop distance from a n-th reference base station among the neighbor base stations is set as a (n+1)-th reference base station, n being a natural number equal to or greater than 2, and
the setting at least two reference base stations is repeated until a predetermined termination condition is satisfied.

4. The method according to claim 3, wherein the setting at least two reference base stations is repeated until all of the set reference base stations are adjacent to at least one other reference base station.

5. The method according to claim 3, wherein, when there are a plurality of base stations having the largest hop distance from the n-th reference base station, the plurality of base stations having the largest hop distance from the n-th reference base station are set as candidate base stations, and a base station having most adjacent reference base stations among the candidate base stations is set as the (n+1)-th reference base station.

6. The method according to claim 2, wherein, when there are a plurality of base stations having the largest hop distance from the first reference base station, the plurality of base stations having the largest hop distance from the first reference base station are set as candidate base stations, and a base station having most adjacent reference base stations among the candidate base stations is set as the second reference base station.

7. The method according to claim 1, wherein terminals belonging to a same group among the terminals connected to the target base station transmit data at a same time resource in a contention-based manner.

8. The method according to claim 1, further comprising transmitting to the target base station time resource information on the allocated time resources and terminal information on terminals allocated to each of the allocated time resources.

9. The method according to claim 1, wherein the terminals connected to the target base station use a different frequency band with terminals connected to the neighbor base stations adjacent to the target base station at a same time resource.

10. An operation method of a terminal in a communication network constituted by a server and a plurality of base stations connected to the server, the operation method comprising:
receiving time resource information and terminal information from a target base station among the plurality of base stations;
identifying a time resource allocated to the terminal based on the time resource information and terminal information; and
transmitting a packet to the target base station based on a listen-before-talk (LBT) scheme at the time resource,
wherein the time resource information and the terminal information are configured by the server through determining neighbor base stations adjacent to the target base station, setting at least two reference base stations based on hop distances between the neighbor base stations, grouping terminals connected to the target base station into at least two groups based on information on a list of the reference base stations to which each of the terminals connected to the target base stations is connectable, and allocating a different time resource to each of the at least two groups.

11. The operation method according to claim 10, wherein, in the setting at least two reference base stations, one of the neighbor base stations is set as a first reference base station, and a base station having a largest hop distance from the first reference base station among the neighbor base stations is set as a second reference base station.

12. The operation method according to claim 11, wherein:
in the setting at least two reference base stations, a base station having a largest hop distance from a n-th reference base station among the neighbor base stations is set as a (n+1)-th reference base station, n being a natural number equal to or greater than 2, and
the setting at least two reference base stations is repeated until a predetermined termination condition is satisfied.

13. A server controlling a wireless communication network comprising a processor and a memory storing at least one instruction executed by the processor, wherein the at least one instruction is configured to:
determine neighbor base stations adjacent to the target base station;
set one of the neighbor base stations as a first reference base station, and set a base station having a largest hop distance from the first reference base station among the neighbor base stations as a second reference base station;
group terminals connected to the target base station into at least two groups based on information of the first reference base station and the second reference base station; and
allocate a different time resource to each of the at least two groups.

14. The server according to claim 13, wherein:
the at least one instruction is further configured to set a base station having a largest hop distance from a n-th reference base station among the neighbor base stations as a (n+1)-th reference base station, n being a natural number equal to or greater than 2, and
the setting at least two reference base stations is repeated until a predetermined termination condition is satisfied.

15. The server according to claim 14, wherein the setting at least two reference base stations is repeated until all of the set reference base stations are adjacent to at least one other reference base station.

16. The server according to claim 14, wherein, when there are a plurality of base stations having the largest hop distance from the n-th reference base station, the at least one instruction is further configured to set the plurality of base stations having the largest hop distance from the n-th reference base station as candidate base stations, and set a base station having most adjacent reference base stations among the candidate base stations as the (n+1)-th reference base station.

17. The server according to claim 13, wherein, when there are a plurality of base stations having the largest hop distance from the first reference base station, the at least one instruction is further configured to set the plurality of base stations having the largest hop distance from the first reference base station as candidate base stations, and set a base station having most adjacent reference base stations among the candidate base stations as the second reference base station.

18. The server according to claim 13, wherein the terminals connected to the target base station use a different frequency band with terminals connected to the neighbor base stations adjacent to the target base station at a same time resource.

* * * * *